Figure 2:
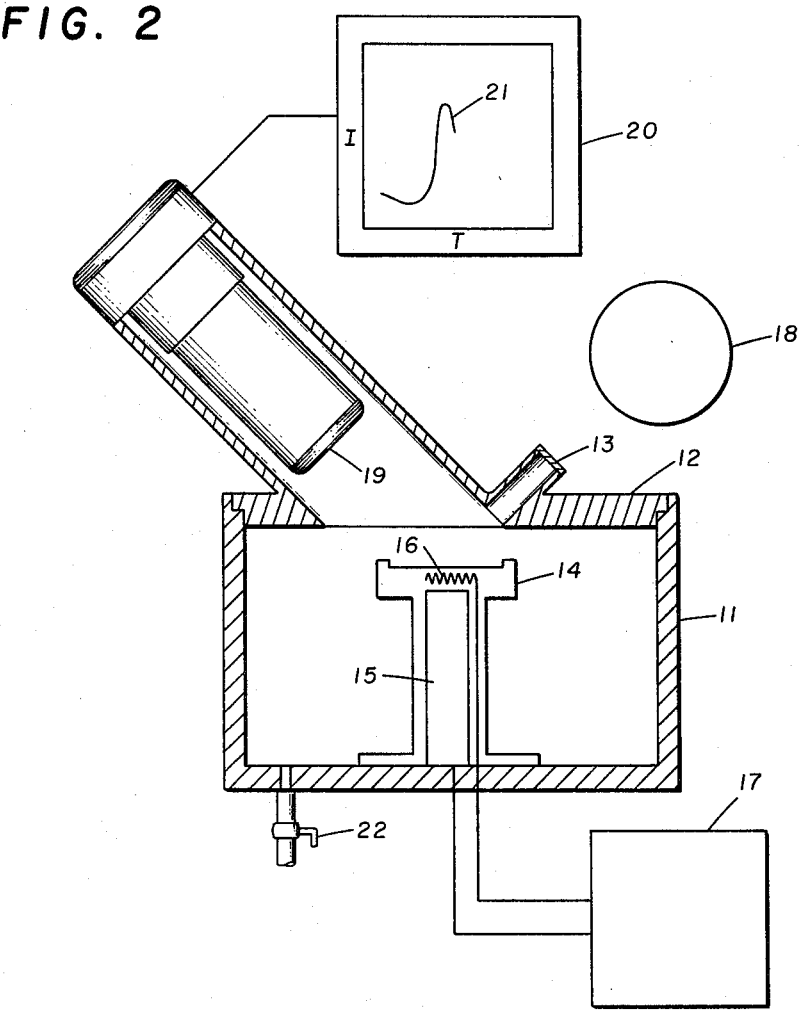

June 11, 1968  W. L. MEDLIN  3,388,252
THERMOLUMINESCENT CHARACTERIZATION OF QUARTZIFEROUS MATERIALS
Filed Nov. 21, 1963

WILLIAM L. MEDLIN
INVENTOR.

BY *William P. Jackson*

ATTORNEY

United States Patent Office 3,388,252
Patented June 11, 1968

3,388,252
THERMOLUMINESCENT CHARACTERIZATION OF QUARTZIFEROUS MATERIALS
William L. Medlin, Dallas, Tex., assignor to Mobil Oil Corporation, a corporation of New York
Filed Nov. 21, 1963, Ser. No. 325,362
16 Claims. (Cl. 250—71)

This invention involves the characterization of quartziferous material on the basis of their thermoluminescent properties and more particularly the stratigraphic correlation of quartziferous earth formations on the basis of quartz thermoluminescene induced by ultraviolet excitation.

Thermoluminescene is a phenomenon due to defects or impurities in a crystal which form electron trapping centers and luminescence centers in the crystal lattice. Upon heating of the crystal, electrons in the trapping centers are ejected from these centers and transferred to a lower energy level, i.e., ground state, through the luminescence centers to ground state, light energy is emitted.

It has heretofore been proposed to characterize earth formations by means of thermoluminescence. For example, in the field of stratigraphy, methods have been proposed for correlating earth formations on the basis of the thermoluminescent properties of the various common thermoluminescent rock minerals such as calcite, dolomite, aragonite, magnesite, anhydrite, and quartz. A common means of observing such thermoluminescent properties is the "glow curve" which is obtained by heating a sample of the thermoluminescent material at a constant rate while measuring the intensity of the emitted light as a function of temperature. In practice, thermoluminescent samples are obtained from the formations under investigation. These samples then are excited by exposing them to a suitable source of ionizing radiation such as X-rays or gamma rays in order to fill the trapping centers with electrons. Thereafter, the glow curve is obtained by heating the sample at a constant rate while measuring the intensity of the emitted light as a function of temperature.

This technique has met with some success when carried out on limestone formations containing minerals such as calcite or dolomite. However, attempts to use artificially induced quartz glow curves in such correlation techniques have proved largely unsuccessful due to the complexity of these curves. Quartz glow curves induced by X-ray or gamma-ray excitation produce prominent glow peaks. However, these glow peaks vary widely in relative intensity and overlap and obscure one another to such an extent that interpretation is rendered very difficult.

It is an object of this invention to provide a method for producing a quartz glow curve which is simpler and better adapted for use in correlation techniques than those induced by X-ray or gamma-ray excitation.

It is a further object of this invention to provide a method of correlating quartziferous formations on the basis of such quartz glow curves.

In carrying out the invention, quartziferous samples from the formations under investigation are annealed at a temperature and for a time sufficient to render them susceptible to thermoluminescent excitation by ultraviolet light. Thereafter, these samples are cooled to a temperature below that at which glow peaks of interest occur and then irradiated with ultraviolet light. The samples then are heated at a substantially constant rate and the thermoluminescent emission from each of these samples is measured as a function of temperature in order to obtain a glow curve. The formations under investigation may then be correlated on the basis of these glow curves.

Figure 1:
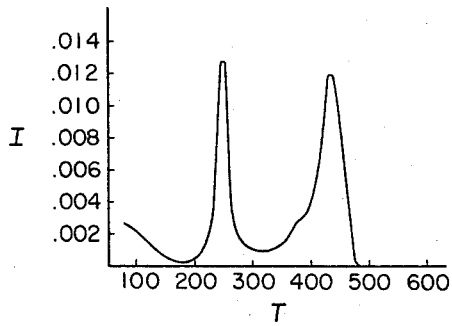

A more detailed description will now be given with reference to the drawings in which:

FIGURE 1 is a quartz glow curve induced by ultraviolet radiation, and
FIGURE 2 is a sectional view of an apparatus suitable for carrying out the glow curve measurements of the present invention.

In correlating quartziferous earth formations such as sandstones on the basis of their thermoluminescent properties, glow curves of samples obtained from spaced outcrops or wells are compared utilizing as correlation indices the temperatures at which the various glow peaks occur, the widths of these glow peaks, and their absolute and relative intensities. As noted above, the results obtained from the application of conventional thermoluminescent correlation techniques to predominantly quartziferous formations have, for the most part, been unsatisfactory because of the complexity of the quartz glow curves induced by X-ray or gamma-ray excitation. Also, attempts to induce glow curves in quartziferous materials by irradiation with ultraviolet light have failed in most cases because the ultraviolet light was not energetic enough to fill the electron trapping centers. However, it has been discovered that glow curves may be induced by ultraviolet excitation in samples of quartziferous materials which have been annealed in the manner described below.

These ultraviolet glow curves show a marked difference over quartz glow curves induced by gamma-ray or X-ray excitation of either annealed or unannealed samples. Quartz glow curves induced by gamma-ray or X-ray excitation typically include five glow peaks the apices of which occur at temperatures of about 165°, 250°, 270°, 510°, and 570° K. The 165° K. glow peak is fairly well defined. However, the glow peaks at 250° and 270° K. are of a much lesser intensity than that at 165° K. and, in addition, they overlap one another to a great extent. These glow peaks therefore have little effectiveness for correlation purposes. Similarly, the 510° and 570° K. glow peaks are poor correlation points because of their very low relative intensities as compared with 165° and even the 250° and 270° K. glow peaks. On the other hand, the glow curves produced in accordance with the present invention include two clearly defined and widely separated glow peaks which do not vary greatly in intensity. These glow peaks are easily recognizable and serve as good correlation points.

In carrying out the method of the present invention, a sample of quartziferous material first is annealed at a temperature and for a time sufficient to render it susceptible to thermoluminescent excitation to render it susceptible ping centers with electrons, by ultraviolet light. Preferably, the sample will be annealed at a temperature of approximately 900° C. for a period of about one hour or more, although the annealing temperature may be as low as 800° C. for a period of at least one hour. The temperature of the sample during the annealing period should not exceed the temperature, normally of the order of 1200° C., at which a change in the crystalline structure of the sample will occur.

After the annealing period, the sample is cooled to a temperature well below those at which glow peaks of interest are expected to occur in order to prevent emptying of the trapping centers associated with these glow peaks during the excitation step. The sample must be cooled below the temperature of at least one glow peak. Preferably, of course, the sample will be cooled below the temperature of all prominent glow peaks. Since a typical ultraviolet glow curve will include two prominent glow peaks, the apices of which occur at about 250° and 430° K., the sample should be cooled to a temperature of not more than 330° K. to prevent emptying of the trapping centers associated with the 430° K. peak and preferably to a temperature of not more than 180° K. to prevent emptying of the trapping centers associated with the 250°

K. glow peak as well. This may conveniently be accomplished by allowing the sample to cool to room temperature and then using liquid nitrogen to further cool the sample to within several degrees of the boiling point of liquid nitrogen, i.e., 78° K.

The sample then is irradiated with ultraviolet light in order to fill the trapping centers. A suitable source of ultraviolet light is a mercury-vapor lamp operated at 5000 microwatts per square centimeter of sample with line emission at wave lengths of 1850 and 2537 A. Numerous other ultraviolet sources with either band or line emission may be used, but for best results radiation should be in both the 1850 and 2537 A. regions. When using the above-described mercury lamp, the sample should be irradiated for a period of about one to five minutes.

After the irradiation or excitation step, the sample is heated at a constant rate preferably within the range of 10°–50° K. per minute, e.g., 30° K. per minute, and the intensity of the resultant thermoluminescent emission from the sample is measured and recorded as a function of temperature to give a glow curve. A typical quartz glow curve induced by ultraviolet excitation is illustrated in FIGURE 1 in which the emission intensity (I) in microlumens is plotted as a function of the sample temperature (T) in degrees Kelvin. The glow curve is relatively simple and comprises two clearly defined glow peaks at temperatures of 250° and 430° K. as contrasted with glow peaks of curves induced by X-ray or gamma-ray excitation, the glow peaks of the ultraviolet glow curves are on the same order of intensity and thus provide good correlation points.

In the application of the present invention to stratigraphic correlation, ultraviolet glow curves for the quartziferous formations under investigation are correlated on the basis of the above-described or other correlation indices in order to match those which are most clearly identical. In order to obtain the most accurate results, the glow curves to be correlated should be obtained under essentially the same conditions. In particular, all of the samples should be subjected to the same total cumulative amount of ultraviolet radiation at the same temperature. The former condition can be met most easily by using the same irradiation time and irradiation rate for all samples. Also, the annealing temperature and time and the heating rate during the glow curve measurement should be the same for each sample. In many cases, strict adherence to these standards will be unnecessary. However, it should be recognized that departure therefrom will increase the probability of error.

The method of the instant invention may also be used in conjunction with conventional techniques for obtaining glow curves. For example, a sample of quartziferous material first may be treated to obtain an X-ray or gamma-ray induced glow curve and then treated to obtain a glow curve induced by ultraviolet light. Both of these glow curves then may be used to characterize the quartziferous material, e.g., by correlation with similarly obtained glow curves of another sample, with the information gained from one glow curve supplementing that from the other.

In this aspect of the invention, a sample is excited with a suitable source of ionizing radiation, e.g., 35-kilovolt X-rays produced by a molybdenum tube operated at 20 milliamperes for a period of five minutes. During this operation, the sample should be maintained at a temperature below the pertinent glow peak temperatures and preferably at a temperature of not more than 130° K. This condition may be met by maintaining the sample at a temperature approaching the boiling point of liquid nitrogen.

After the excitation step, the sample is heated at a constant rate preferably within the range of 10°–50° K. per minute, e.g., 30° K. per minute, and the emission intensity is recorded as a function of time in order to obtain an X-ray glow curve. Thereafter, the sample is annealed and treated as described above in order to obtain an ultraviolet glow curve. These glow curves then may be correlated with the X-ray and ultraviolet glow curves of another sample. As in the case of ultraviolet glow curves, the X-ray glow curves of correlative samples should be obtained under essentially the same conditions of sample temperature, irradiation, and heating rate.

An apparatus suitable for carrying out the glow curve measurements for the instant invention is illustrated in FIGURE 2. This apparatus comprises a light-tight nitrogen container 11, a cover 12 therefor having a beryllium window 13, a sample holder 14, a heating element 15, a temperature sensing element 16 and control circuit 17 for controlling the heat supplied to the sample, an ultraviolet light source 18, a photomultiplier 19, and a recorder 20. The apparatus further comprises a spigot 22 through which liquid nitrogen may be withdrawn from the container.

In carrying out the glow curve measurements, a sample is ground into powder form and after first annealing it in the above-described maner, it is placed on the sample holder 14. The container 11 then is filled with liquid nitrogen and the cover 12 is placed as shown in the drawing. After the sample comes to within three or four degrees Kelvin of the boiling point of liquid nitrogen, the level of the nitrogen in the container is adjusted to a point just below the top of sample holder 14 so that it does not cover the sample. Thereafter, the sample is irradiated with ultraviolet light from source 18 for the desired length of time. After the excitation period, the nitrogen is withdrawn from the container through spigot 22 and the glow curve measurements are started by heating the sample at a uniform rate. The photomultiplier 19 measures the light intensity and produces a signal representative thereof which is recorded by the recorder 20 as a function of temperature to give a glow curve 21.

The apparatus of FIGURE 2 may also be used to obtain glow curves induced by gamma-ray or X-ray excitation in the event this is desirable. In this case, of course, the ultraviolet light source 18 will be replaced with a suitable X-ray or gamma-ray source.

Having described certain specific embodiments of the instant invention, it will be understood that other modifications may suggest themselves to those skilled in the art, and it is intended to cover all such modifications as fall within the scope of the appended claims.

I claim:

1. A method of obtaining a glow curve for a quartziferous material, comprising the steps of:
   (a) annealing said quartziferous material at a temperature and for a time sufficient to render it susceptible to thermoluminescent excitation by ultraviolet light,
   (b) cooling said material to a temperature below the temperature of at least one glow peak,
   (c) irradiating said material with ultraviolet light, and
   (d) heating said material at a substantially constant rate and measuring the thermoluminescent emission therefrom as a function of temperature to obtain a glow curve.

2. The method of claim 1 wherein said material is annealed at a temperature of at least 800° C. for a period of at least one hour.

3. The method of claim 1 wherein said material is annealed at a temperature of about 900° C. for a period of at least one hour.

4. The method of claim 1 wherein said ultraviolet light includes wave lengths of 1850 and 2537 A.

5. The method of claim 1 wherein said material is cooled to a temperature of not more than 330° K.

6. The method of claim 1 wherein said material is cooled to a temperature of not more than 180° K.

7. The method of claim 1 wherein said material is heated at a substantially constant rate within the range of 10°–50° K. per minute.

8. A method of obtaining a glow curve for a quartziferous material, comprising the steps of:
   (a) annealing said quartziferous material at a temperature of at least 800° C. for a period of at least one hour,
   (b) cooling said material to a temperature of not more than 180° K.,
   (c) irradiating said material with ultraviolet light which includes wave lengths of 1850 and 2537 A., and
   (d) heating said material at a substantially constant rate and measuring the thermoluminescent emission therefrom as a function of temperature to obtain a glow curve.

9. A method of correlating a plurality of quartziferous earth formations, comprising the steps of:
   (a) obtaining samples of quartziferous material from each of said formations,
   (b) anealing each of said samples at a temperature and for a time sufficient to render them susceptible to thermoluminescent excitation by ultraviolet light,
   (c) cooling each of said samples to a temperature below the temperature of at least one glow peak,
   (d) irradiating each of said samples with ultraviolet light,
   (e) heating each of said samples at a substantially constant rate and measuring the thermoluminescent emission therefrom as a function of temperature to obtain a glow curve for each of said samples, and
   (f) correlating said formations on the basis of said glow curves.

10. A method of characterizing a quartziferous material, comprising the steps of:
    (a) irradiating said quartziferous material with ionizing radiation selected from the class consisting of X-rays and gamma rays,
    (b) heating said material and measuring the thermoluminescent emission therefrom as a function of temperature to obtain a first glow curve,
    (c) annealing said material at a temperature and for a time sufficient to render it susceptible to thermoluminescent excitation by ultraviolet light,
    (d) cooling said material to a temperature below the temperature of a least one glow peak,
    (e) irradiating said material with ultraviolet light,
    (f) heating said material at a substantially constant rate and measuring the thermoluminescent emission therefrom as a function of temperature to obtain a second glow curve, and
    (g) characterizing said quartziferous material on the basis of said first and second glow curves.

11. A method of obtaining a glow curve for a quartziferous material, comprising the steps of:
    (a) annealing said quartziferous material at a temperature of at least 800° C. for a period of at least one hour,
    (b) cooling said material to a temperature of not more than 330° K.,
    (c) irradiating said material with ultraviolet light, and
    (d) heating said material at a substantially constant rate and measuring the thermoluminescent emission therefrom as a function of temperature to obtain a glow curve.

12. The method of claim 11 wherein said material is cooled in step (b) to a temperature of not more than 180° K.

13. A method of correlating a plurality of quartziferous earth formations, comprising the steps of:
    (a) obtaining samples of quartziferous material from each of said formations,
    (b) annealing each of said samples at a temperature of at least 800° C. for a period of at least one hour,
    (c) cooling each of said samples to a temperature of not more than 330° K.,
    (d) irradiating each of said samples with ultraviolet light,
    (e) heating each of said samples at a substantially constant rate and measuring the thermoluminescent emission therefrom as a function of temperature to obtain a glow curve for each of said samples, and
    (f) correlating said formations on the basis of said glow curves.

14. The method of claim 13 wherein said material is cooled in step (b) to a temperature of not more than 180° K.

15. A method of characterizing a quartziferous material, comprising the steps of:
    (a) irradiating said quartziferous material with ionizing radiation selected from the class consisting of X-rays and gamma rays,
    (b) heating said material and measuring the thermoluminescent emission therefrom as a function of temperature to obtain a first glow curve,
    (c) annealing said material at a temperature of at least 800° C. for a period of at least one hour,
    (d) cooling said material to a temperature of not more than 330° K.,
    (e) irradiating said material with ultraviolet light,
    (f) heating said material at a substantially constant rate and measuring the thermoluminescent emission therefrom as a function of temperature to obtain a second glow curve, and
    (g) characterizing said quartziferous material on the basis of said first and second glow curves.

16. The method of claim 15 wherein said material is cooled in step (d) to a temperature of not more than 180° K.

References Cited

UNITED STATES PATENTS

| | | | |
|---|---|---|---|
| 2,451,885 | 10/1948 | Stevens et al. | 250—71 |
| 2,573,245 | 10/1951 | Boyd et al. | 250—71 |
| 2,899,558 | 8/1959 | Lewis | 250—71 X |

ARCHIE R. BORCHELT, *Primary Examiner.*

UNITED STATES PATENT OFFICE
CERTIFICATE OF CORRECTION

Patent No. 3,388,252                                    June 11, 1968

William L. Medlin

It is hereby certified that error appears in the above numbered patent requiring correction and that the said Letters Patent should read as corrected below.

Column 1, line 2, "material" should read -- materials --; line 21, "nescence centers to ground state, light energy is emitted." should read -- nescence centers. As the electrons are transferred from the luminescence centers to ground state, light energy is emitted. --. Column 2, line 48, "to thermoluminescent excitation to render it susceptible" should read -- to thermoluminescent excitation, i.e., filling of the trap- --. Column 5, line 18, "anealing" should read -- annealing --.

Signed and sealed this 21st day of October 1969.

(SEAL)
Attest:

EDWARD M. FLETCHER, JR.                      WILLIAM E. SCHUYLER, JR.
Attesting Officer                               Commissioner of Patents